R. E. HELLMUND.
SYSTEM OF CONTROL.
APPLICATION FILED AUG. 9, 1915.

1,298,706.

Patented Apr. 1, 1919.
6 SHEETS—SHEET 1.

WITNESSES:
R. J. Fitzgerald
W. R. Coles

INVENTOR
Rudolf E. Hellmund.
BY
Wesley G. Carr
ATTORNEY

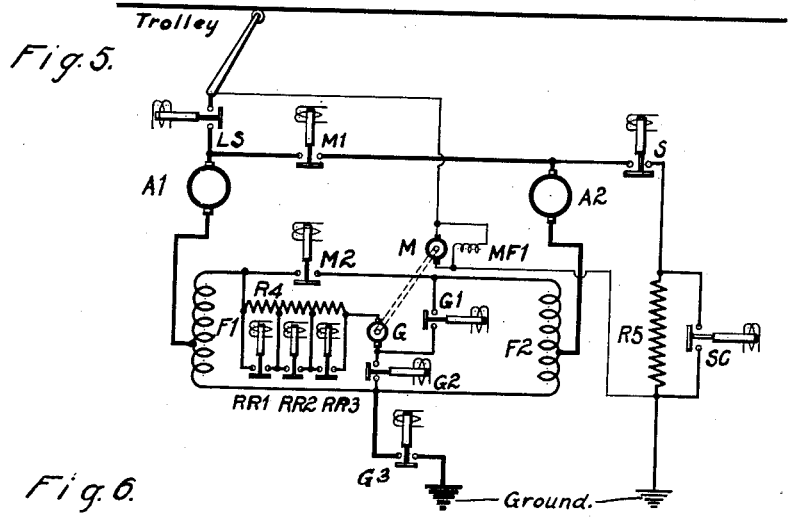
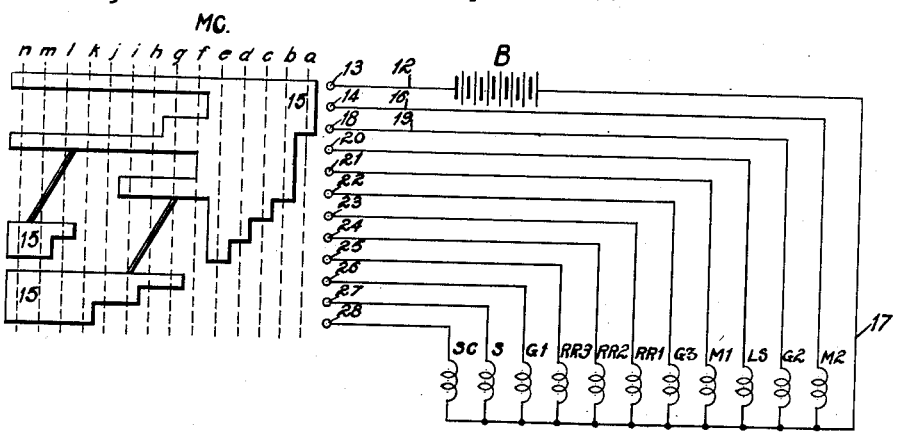

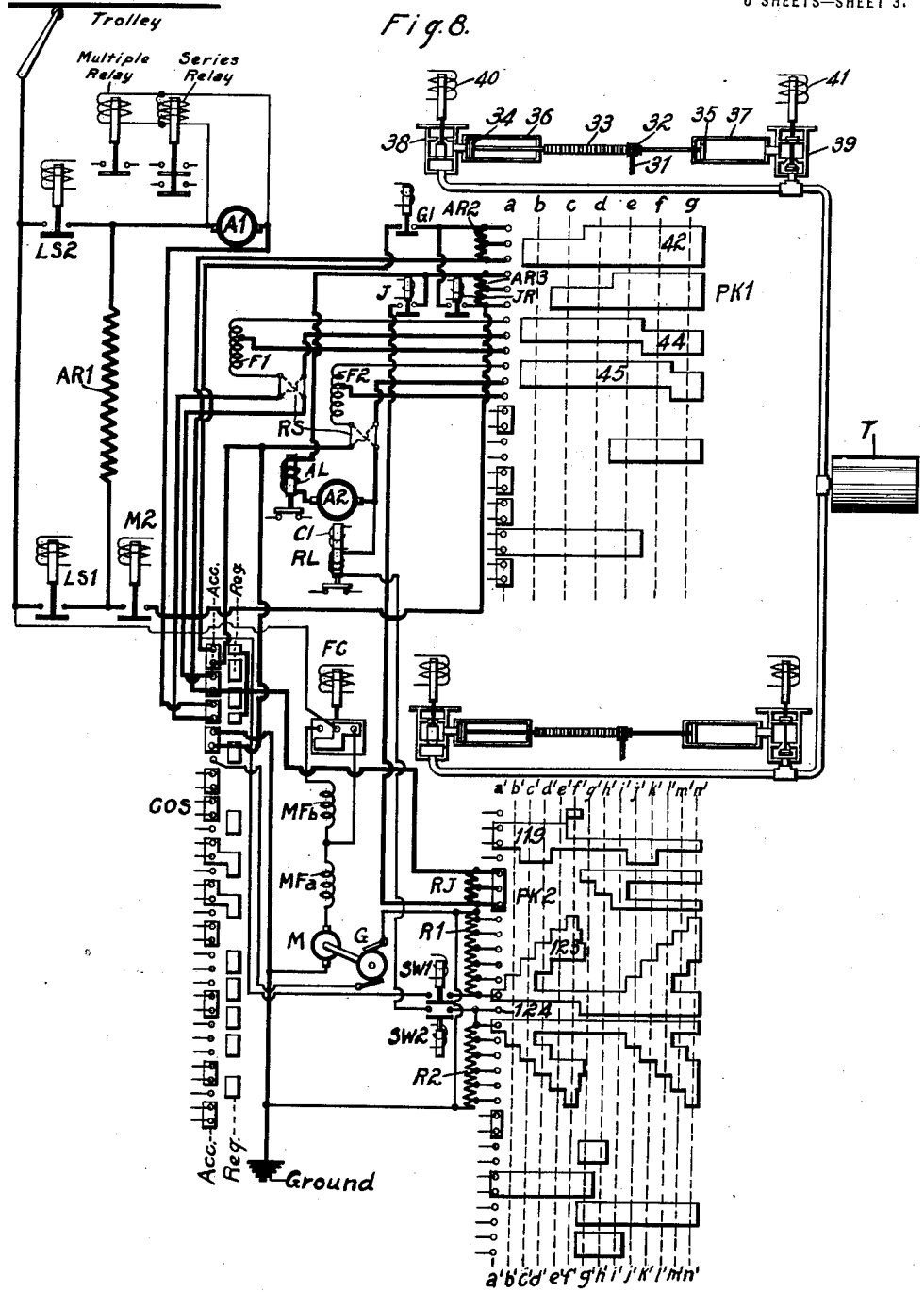

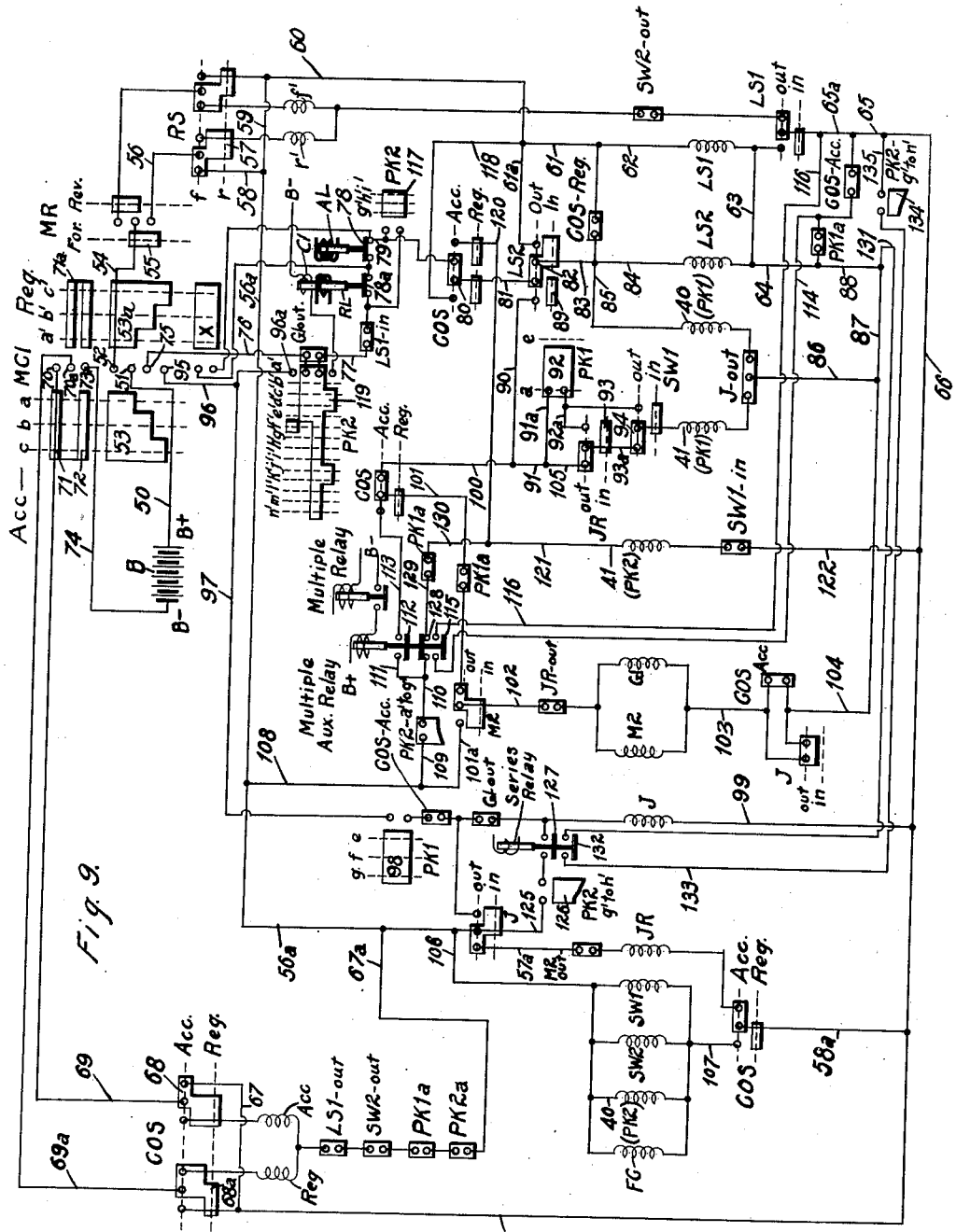

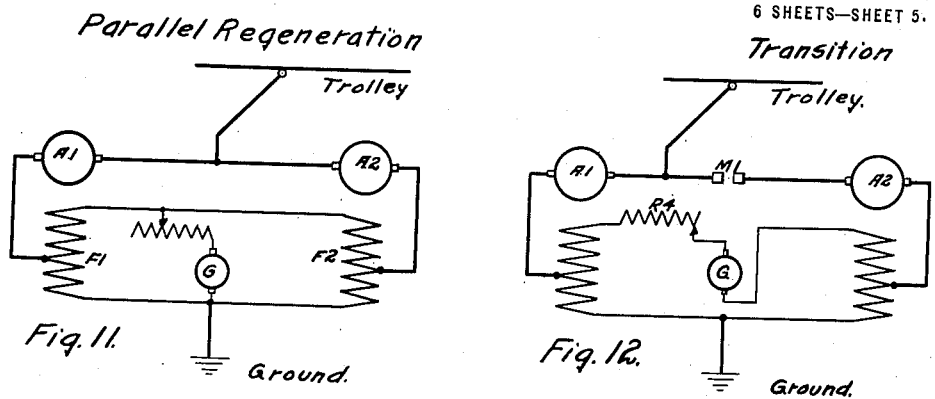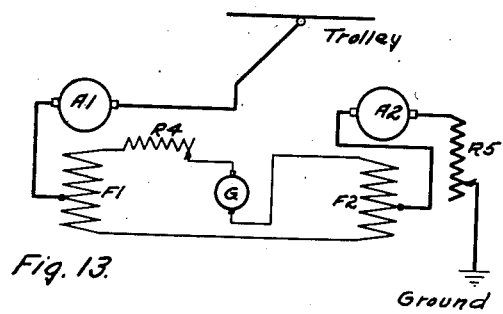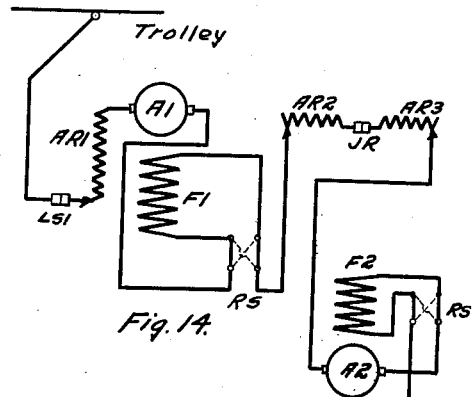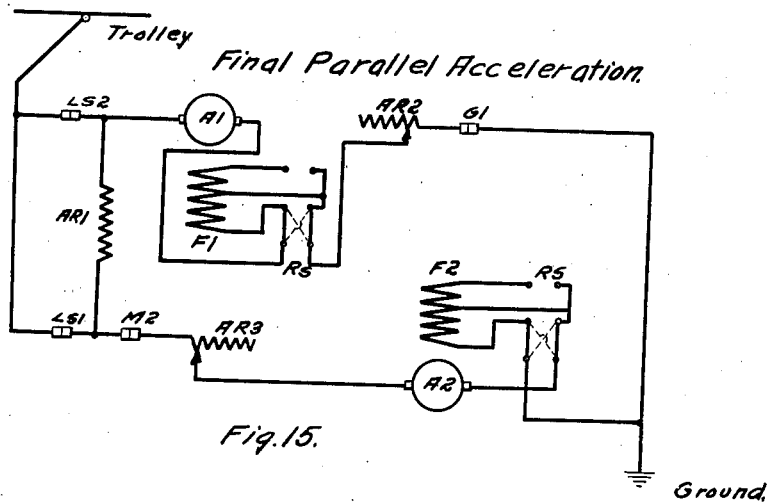

R. E. HELLMUND.
SYSTEM OF CONTROL.
APPLICATION FILED AUG. 9, 1915.

1,298,706.

Patented Apr. 1, 1919.
6 SHEETS—SHEET 6.

WITNESSES:
William Siler
W. R. Coley

INVENTOR
Rudolf E. Hellmund
BY
Chesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,298,706. Specification of Letters Patent. Patented Apr. 1, 1919.

Application filed August 9, 1915. Serial No. 44,443.

*To all whom it may concern:*

Be it known that I, RUDOLF E. HELLMUND, a subject of the German Empire, and a resident of Pittsburgh, in the county of Allegheny and State of Pennsylvania have invented a new and useful Improvement in Systems of Control, of which the following is a specification.

My invention relates to systems of control, and it has special reference to the control of motors that are adapted for regenerative operation in electric railway vehicles and the like.

The object of my invention is to provide a relatively simple system of the above-indicated character which may readily be combined with existing standard systems for motor acceleration at a relatively small expense for new apparatus; which shall be effective and reliable in operation and capable of withstanding considerable abuse when necessary, and which, in addition, shall, of course, provide the usual and well-known advantages of regenerative operation, such as economy of energy and wear of brake shoes.

In a co-pending application of R. E. Hellmund and R. E. Ferris, Serial No. 25,714, filed May 4, 1915, and assigned to the Westinghouse Electric and Manufacturing Company, is disclosed a system embodying some of the features shown and described hereinafter, in connection with a single motor. According to my present invention, I provide a regenerative system embodying a single source of energy for the field windings of a plurality of regenerating dynamo-electric machines and means for independently and automatically regulating the operation of the individual machines to maintain a substantially balanced-load condition between the several machines and also to maintain a substantially constant total regenerative current, as hereinafter more fully set forth.

Figure 1:
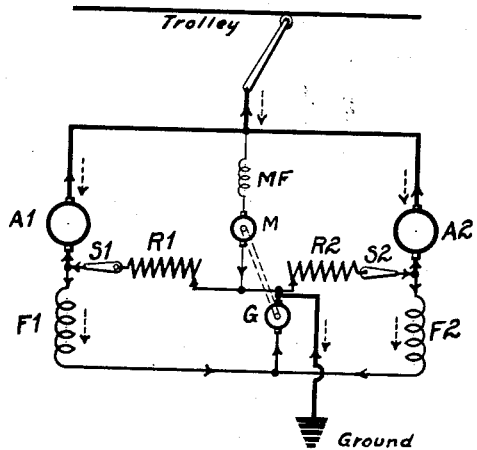
Figure 2:
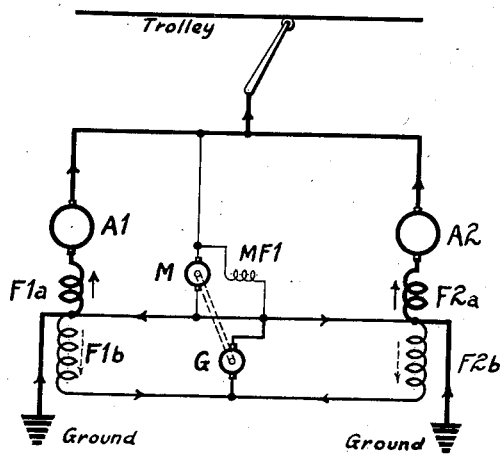
Figure 3:
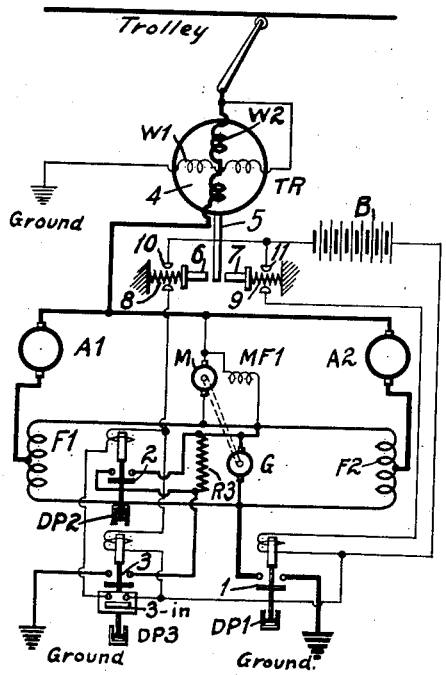
Figure 4:
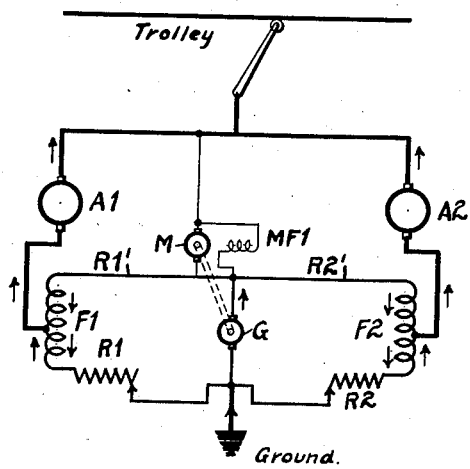

In the accompanying drawings, Figure 1 is a simplified diagrammatic view of the main-circuit connections of a system embodying my invention; Fig. 2 is a similar view of a modified form of main-circuit connections; Fig. 3 is a further modified diagrammatic view of a system embodying certain features of my invention, and also showing an auxiliary governing system for effecting certain additional circuit changes; Fig. 4 is a view similar to Fig. 1 and disclosing a modification thereof; Fig. 5 is a diagrammatic view of the main circuits of a modified system disclosing my invention; Fig. 6 is a diagrammatic view of the auxiliary governing circuits for manipulating the various switches shown in Fig. 5 in accordance with a sequence chart of well-known form that is shown in Fig. 7; Fig. 8 is a diagrammatic view of the complete main-circuit connections of an improved commercial system embodying my invention; Fig. 9 is a diagrammatic view of the complete automatic auxiliary circuits for the system shown in Fig. 8; Fig. 10 is a detail view of one of the main-circuit switches that is employed in connection with the systems shown in Figs. 8 and 9; Fig. 11, Fig. 12 and Fig. 13 are simplified diagrammatic views corresponding to Fig. 5 and illustrating the circuit connections for parallel regeneration, transition and series regeneration, respectively, as indicated by the accompanying legends; and Fig. 14 to Fig. 18, inclusive, are simplified diagrammatic views corresponding to Fig. 8 and showing the circuit connections for initial series acceleration, final parallel acceleration, preliminary to regeneration, parallel regeneration and series regeneration, respectively, as designated by the accompanying legends.

Referring to Fig. 1 of the drawings, the system here shown comprises a plurality of suitable supply-circuit conductors respectively marked "Trolley" and "Ground"; a plurality of dynamo-electric machines respectively having armatures A1 and A2 and series-connected field-magnet windings F1 and F2; a motor-generator or dynamotor having a plurality of series-connected armature windings M and G, respectively, and a series-connected field-magnet winding MF; and a plurality of variable translating devices, such as resistors R1 and R2.

The connections shown are adapted for regenerative operation, the two dynamo-electric machines being connected in parallel-circuit relation, the motor-generator or dynamotor being connected across the supply circuit, and the armature winding G being connected, through the resistors R1 and R2, respectively, across the field windings F1 and F2. The upper terminal of the armature G, that is, the terminal adjacent to the resistors R1 and R2, is shown as directly connected to the negative conductor Ground.

In various prior regenerative systems, when the regenerating machines have been connected in parallel relation, the distribution of the load, that is, the regenerated current, between the armatures has, in general, been unequal, since slight differences in the size of the wheels that are associated with the respective motors and in the respective air gaps of the several motors, for example, have changed the counter-electromotive forces of the machines sufficiently to effect material differences in the regenerated current produced by the several motors.

In the system just described, it will be noted that the regenerated currents, that is, the currents traversing the main armature windings A1 and A2, respectively traverse the resistors R1 and R2 in the same direction as the currents sent through the respective resistors by the common source of excitation, the generator G, as indicated by the solid-line arrows. For this reason, if the regenerated current in either main armature increases, for instance, the ohmic drop in the corresponding resistor is proportionately increased, with the result that the portion of the voltage of the generator G that is impressed upon the corresponding main field-magnet winding is decreased. Consequently, the regenerated current produced by the main armature in question is immediately reduced to the substantially constant value that is desired and, in general, the motor, while regenerating, has a negative compounding effect that tends to inherently prevent sudden or material changes in the regenerated current by reason of fluctuations of supply circuit voltage, for example. Such a system, as applied to a single motor, is fully shown and described in the above-mentioned co-pending application and it is not believed that any further exposition of this operation will be required here.

However, I desire to emphasize the point, that, in the system shown in Fig. 1, the field-magnet windings of all of the regenerating machines are excited by a single source of energy, and the corrective negative compound effect in each individual machine is independent of such effect in any of the other machines, whereby the regenerated load is equally distributed upon the several machines throughout their period of regeneration, irrespective of differences in the diameters of the corresponding wheels.

As indicated in the figure, the resistors R1 and R2 may be varied, as the speeds of the regenerating machines decrease, to maintain the substantially constant regenerative current that is desired, as more fully set forth in connection with the automatic system that is shown in Figs. 8 and 9. Moreover, if desired, the resistors, instead of being connected in the circuit shown, may be disposed in the circuits connecting the lower ends of the main field windings F1 and F2, or in the conductor that joins the lower terminal of the generator G to the lower ends of the field windings, or in the conductor that connects the lower terminal of the armature winding M to the generator winding G, or in the conductor that is disposed between the conductor joining the resistors R1 and R2 and the conductor that is connected to ground. Some of these modifications possess particular advantages, as will be described in connection with some of the other figures.

However, in the system just described, the inherent balancing or regulating action is lost upon complete removal of the resistors R1 and R2. As a further modification, therefore, predetermined fixed, and relatively small amounts of, resistance may be substituted for the resistors R1 and R2, and a variable resistor, located as shown in the system that is illustrated in Fig. 5, which location corresponds to the last case cited above, may be employed.

Inasmuch as the voltage of the generator G is maintained substantially constant during the operation of the system, it will be evident that any other suitable source of exciting energy, such as a storage battery, may be employed, if desired.

In some cases, it may be desired to employ the auxiliary source of excitation in connection with the acceleration of the main motors also, or it may be desired to operate the motors in this manner, for a certain period and then change over to the ordinary series operation from the supply circuit later. To make the latter change in the system shown in Fig. 1, it is merely necessary to open switches, such as S1 and S2, that respectively serve to connect the resistors R1 and R2 to the circuits of the main machine. The directions of the various currents are indicated by the dotted arrows. However, if no further changes are made in the connections, it will be observed that the armature winding G receives substantially the full main-motor current during acceleration, which may lead to undesirable over-heating or other losses, in addition to requiring a motor-generator of relatively large capacity. To obviate this disadvantage, the armature winding G may be cut out of circuit in a manner similar to that to be described in connection with the system shown in Fig. 3.

Although other types of motor-generators or dynamotors may be employed in some cases, the series-excited dynamotor of Fig. 1 has an important advantage in that the speed and the voltage output of the exciting armature follow the variations of supply-circuit voltage, as reflected in the changes of current in the common series field winding for both armature windings of the dynamotor. Thus, at all times, the generator voltage bears a substantially constant ratio to the voltage of the supply circuit. The series-excited dynamotor thus constitutes or embodies single-machine or unitary means for jointly varying the excitation of the main machines in accordance with the line voltage.

Referring now to Fig. 2, the system shown comprises the supply-circuit conductors Trolley and Ground, and the main dynamo-electric machines having the armatures A1 and A2 and also severally having plural-section field windings, the sections being differentially connected with respect to each other during regeneration. Thus, for example, the field-winding section F1$a$ is disposed to receive the main regenerated current, while the associated field winding section F1$b$ is connected to receive the exciting current of the armature winding G in such direction as to oppose the flux produced by the section F1$a$. The junction-point of the field-winding sections F1$a$ and F1$b$ is connected to the ground. The motor-generator is here shown as having its armature winding M connected across the supply circuit, and is provided with a shunt field winding MF1 that is connected in parallel relation with the armature winding M. It will be understood that either the shunt or the series type of the motor-generator or dynamotor may be employed in my invention, the series type being illustrated in Fig. 1.

The system shown in Fig. 2 may be employed to greatest advantage in motors of the well-known "field-control" type, wherein a predetermined portion of the field winding is excluded from circuit during acceleration, for a well-known purpose. In such cases, it will be convenient to employ the smaller portion of the field winding as the section F1$a$ of Fig. 2.

The operation of the system just described may be set forth as follows: Inasmuch as the currents in the field winding sections F1$a$ and F1$b$, for example, traverse the sections in opposite directions, as indicated by the arrows, it will be appreciated that, if an increase of regenerated current traversing the armature A1 occurs, the effective field excitation produced by the increased energization of the section F1$a$ and the substantially constant energization of the section F1$b$ will be such as to provide a relatively weakened exciting flux for the armature A1, whereby the regenerated current will again be reduced to the normal value, and the converse operation will, of course, take place in case of a decrease of regenerated current. Such a system, as applied to a single motor, is shown and described in my co-pending application, Serial No. 860,612 and filed Sept. 8, 1914, and no further description thereof is believed to be necessary. However, in the system illustrated in Fig. 2, it will be noted that I have again provided a system wherein the field windings of all of the regenerated machines are energized by a single exciting source, whereas inherent regulation of the load carried by each individual machine is maintained independently of the operation of the other machines to maintain a substantially balanced load distribution.

Referring now to Fig. 3, the main circuits of the system shown are similar to those illustrated in Fig. 2. However, the armature windings A1 and A2 are connected to preferably the mid-points of the respective field windings F1 and F2 for a purpose to be described, and a plurality of main-circuit switches 1, 2 and 3 are also employed, the switch 1 serving to connect the lower terminals of the field windings to ground, which connection is suitable for accelerating operations, and the switches 2 and 3 being adapted for use in regeneration to effect a ground connection similar to that shown in Fig. 1. The switches 1 and 3 are preferably provided with dash-pots DP1 and DP3, respectively, for retarding the opening movement of the switches, and the switch 2 is preferably provided with a dash-pot DP2 for retarding the closing movement of the switch. The switch 2 is adapted to short-circuit a resistor R3 that is employed during the transition from accelerating to regenerating connections, or vice versa. The switches are shown as provided with actuating coils that may be energized from a suitable battery B.

To automatically operate the switches 1, 2 and 3, a torque-relay device TR may be employed. The device TR comprises a plurality of suitable windings W1 and W2 that are disposed in quadrature relation, the winding W1 being connected across the supply circuit and the winding W2 being connected in series-circuit relation with the main machines. A rotatable member or rotor 4 of the relay device is adapted to be actuated in the one or the other direction in accordance with the torque produced by the windings W1 and W2. The rotor 4 is provided with a suitable projecting arm 5 that is adapted to engage movable contact member 6 or a corresponding contact member 7, according to its direction of operation. The contact members 6 and 7 are respectively biased to predetermined opened positions by suitable springs 8 and 9, and, when engaged by arm 5, the members are respectively adapted to make contact with a plurality of pairs of stationary contact members 10 and 11. When the arm 5 moves to the right, the contact members 11 are bridged by the movable contact member 7 and the switch 1 is closed, whereas, when the arm 5 is moved to the left, the contact members 10 are bridged by the movable contact member 6 and the switches 2 and 3 are actuated, as explained more fully later.

Assuming that the motors are being accelerated and that the switch 1 has been closed in any suitable manner in connection with the auxiliary control system employed, the contact member 7 bridges the stationary contact members 11, and the switch 1 is held in its closed position. However, if, by reason of descending a grade, for example, the counter-electro-motive forces of the motors exceed the supply circuit voltage, they will be converted into momentum-driven generators, whereupon the current traversing the winding W2 of the torque relay TR will be reversed, with the result that the arm 5 will swing over to the left to effect the bridging of the stationary contact members 10 by the movable contact member 6. In this way, the actuating coil of the switch 3 will be immediately energized from the battery B and will close just before the action of the dash pot DP1 has allowed the switch 1 to open. Upon the closure of the switch 3, the actuating coil of the switch 2 is energized through an interlock 3—in and the switch 2 is gradually closed, in accordance with the action of the dash-pot DP2, to short-circuit the resistor R3, when the circuit connections are similar to those illustrated in Fig. 1.

Should suitable conditions subsequently obtain for again effecting the operation of the main machines as motors, the reversal of the current in the winding W2 of the torque relay will again effect the bridging of the contact members 11 by the movable contact member 7, whereupon, the switch 2 is first opened to again insert the resistor R3 in circuit, and the switch 1 is then closed. The switch 3 will be opened a short time after the closure of the switch 1 by reason of the action of the dash-pot DP3. In this way, the main machines may transfer their operation from acceleration to regeneration, and vice versa, without requiring any attention upon the part of the train operator and without requiring an interruption of the main circuits at any time, provided the dash-pots are employed as indicated. Otherwise, of course, the circuit connections will at times be interrupted during the transition and will be subsequently remade.

The operation of the switches 1, 2 and 3, as just described, may be employed to cut the armature winding G out of the main circuit in the system shown in Fig. 1, if desired, as already mentioned.

Certain features of the system shown in Fig. 3 are shown and described and broadly claimed in my co-pending application, Serial No. 69,187, filed Dec. 29, 1915, and, consequently, such features will not be claimed in the present application.

Referring to Fig. 4, the main circuits shown are similar to those illustrated in Fig. 3 when the switch 1 is closed, with the addition of resistors R1 and R2 that are respectively disposed intermediate the lower terminals of the field windings F1 and F2 and the common ground connection. It will be noted that the armatures A1 and A2 are again connected to substantially the mid-point of the respective field windings. In this way, a negative compound effect is inherently obtained in the machine during regenerative operation, and the system has certain advantages over the type of connections that is shown in Fig. 2, for the following reasons. In motors of the "field-control" type, as usually designed to afford the best accelerating operation, the negative compound effect obtained during regeneration, if the sections of the field windings are differentially disposed with respect to each other, is too great; and, moreover, the heating of the field windings is relatively large, in view of the fact that the resultant exciting ampere turns produced by the two sections correspond to the difference in the ampere turns set up by each section, while the heating effect is proportional to the sum of all the ampere turns. The system shown in Fig. 4 overcomes this difficulty. For instance, as soon as the regenerated current begins to flow, it traverses the lower portions of each of the field windings F1 and F2 in the opposite direction to the exciting current produced by the armature winding G, as indicated by the arrows. Consequently, both the resultant ampere turns and the heating effect occur in proportion to the differences between the regenerated and the auxiliary exciting currents. Under certain conditions of load, when the exciter current is substantially equal to the load current, the two currents will neutralize each other in the lower portion of the winding, and the heating effect will be reduced to substantially zero.

If the negative compound effect obtained in the system as shown is too great, the resistors R1 and R2 may be employed to reduce it. Since the exciting and load currents traverse these resistors in opposite directions, an increased load current will decrease the resultant ohmic drop in this part of the circuit, whereby an increased portion of the voltage of the armature winding G will be impressed upon the upper portion of each of the field windings. Consequently, the final negative compound effect is less than that obtained without the use of the resistors R1 and R2.

On the other hand, if the negative compound effect obtained without the use of resistors is too small, it may be increased by connecting the resistors R1 and R2 in the positions shown in Fig. 1, whereby the exciter and the load currents traverse the resistors in the same direction and produce the desired negative compound effect, as already described in connection with the system shown in Fig. 1.

I have thus provided relatively simple means for producing, in a system of the type under consideration, a negative compound effect that may be varied in any desired degree to effect proper regenerative operation.

Reference may now be had to Fig. 5, wherein is shown a novel system of parallel-series regenerative operation of a plurality of dynamo-electric machines. The system here shown comprises the supply-circuit conductors Trolley and Ground; the main machines having the armatures A1 and A2 that are respectively connected to an intermediate point of the field windings F1 and F2; the motor-generator or dynamotor as illustrated in Fig. 2; a plurality of main-circuit switches LS, M1, S, SC, M2, G1, G2, G3, RR1, RR2 and RR3; a resistor R4 that is adapted to be short-circuited in sections by the three last-mentioned switches and that is connected intermediate the upper terminal of the armature winding G and the upper terminal of the field winding F1; and a resistor R5 that is adapted to be connected in shunt to one of the main machines during transition from parallel to series relation. The ordinarily employed reversing switches for reversing the electrical relations of the corresponding armatures and field-magnet windings have been omitted for the sake of simplicity and clearness, although it will be understood that, in a complete system, such switches will be provided.

The auxiliary control system shown in Fig. 6 includes the actuating coils for the various motor-controlling switches that are shown in Fig. 5, and, in addition, a master controller MC that is adapted to occupy a plurality of operative positions $a$ to $n$, and a suitable source of energy, such as a battery B, for energizing the various actuating coils through the master controller, in accordance with the sequence chart of Fig. 7.

Assuming that the master controller is moved to its initial operative position $a$, the operation of the system may be set forth as follows: A circuit is first established from one terminal of the battery B through conductor 12, control fingers 13 and 14, which are bridged by a contact segment 15 of the master controller, conductor 16, the actuating coil of the switch M2 and conductor 17 to the opposite terminal of the battery B. Another circuit is simultaneously established from the contact segment 15, through control finger 18 and conductor 19, to the actuating coil of the switch G2. The generator armature winding G is thus connected through the resistor R4, in series-circuit relation with each of the parallel-related main field windings F1 and F2, whereby the voltages of the main armatures A1 and A2 are built up to a value slightly above that of the supply circuit (see Fig. 11).

Upon actuation of the master controller to its position $b$, the contact segment 15 engages control fingers 20, 21 and 22, whence circuit is completed, in the usual manner, through the actuating coils of the switches LS, M1 and G3. The main dynamo-electric machines are thus connected in parallel-circuit relation between the supply-circuit conductors, Trolley and Ground, and the regenerative operation is started.

In position $c$, $d$ and $e$ of the master controller, control fingers 23, 24 and 25 respectively engage the contact segment 15, whereby the actuating coils of the resistor-short-circuiting switches RR1, RR2 and RR3 are energized to gradually effect the short-circuit of the resistor R4, to maintain a substantially constant regenerated current as the speeds of the main dynamo-electric machines decrease, as will be understood.

In transition position $f$, the switches M1, M2, RR1, RR2 and RR3 are opened by reason of the disengagement of the corresponding control fingers from the contact segment 15. In position $g$, control finger 26 engages contact segment 15 to effect the closure of switch G1, while, in position $h$, the switch G2 is opened, thus disposing the armature G in a local series circuit with the resistor R4 and the main field windings F1 and F2 (see Fig. 12). In position $i$, contact segment 15 engages control finger 27, whence circuit is completed through the actuating coil of the switch S.

In position $j$, the switch G3 is opened by reason of the disengagement of the corresponding control finger from the contact segment. 15, whereby the only ground connection for the system is that directly associated with the transition resistor R5 (see Fig. 13).

In position $k$, a control finger 28 engages the contact segment 15 to affect the closure of the switch SC, whereby the transition resistor R5 is short-circuited. The main circuit at this time may be traced as follows:

From the trolley, through the armature A1, the local circuit above referred to, that includes the generator armature G, and the armature A2 to ground.

In the last three positions $l$, $m$, and $n$, of the master controller, the resistor R4 is again short-circuited in sections by the successive closure of the switches RR1, RR2 and RR3, whereby a substantially constant regenerated current is maintained to a relatively low speed of the momentum-driven machines, as will be understood.

It will be observed that, in the system just described, the generator armature G is initially connected in parallel-circuit relation to the main field windings F1 and F2, and that the main armature windings A1 and A2 are initially in parallel-circuit relation also. To effect further regenerative operation of the system, the machine having the armature A2 is disconnected from the circuit, the other machine remaining fully operative, the generator armature G is connected in series-circuit relation with the main field windings F1 and F2, and the machine having the armature A2 is temporarily shunted by the resistor R5 to effect the smooth transition of the main machines from parallel to series relation.

Reference may now be had to Fig. 8, which shows the complete main-circuit connections of an improved commercial type of system embodying my invention. The system illustrated comprises the supply-circuit conductors, Trolley and Ground; a plurality of main dynamo-electric machines having the armatures A1 and A2 and corresponding series-connected field magnet windings F1 and F2; a reversing switch RS of a familiar electrically-controlled drum type, which is shown conventionally here, for the purpose of reversing the electrical relations of the corresponding armatures and field windings; a plurality of accelerating resistors AR1, AR2 and AR3; a plurality of main-circuit switches LS1, LS2, M2, JR, J, G1, SW1 and SW2; a transition resistor RJ for a purpose to be described; a plurality of resistors R1 and R2 that are employed during regenerative operation of the system only; and automatically-operated controller PK1 that is adapted to occupy an off position $a$, and a plurality of operative positions $b$ to $g$, inclusive, and that is preferably of the drum type, for manipulating various circuit connections during the accelerating period of the motors; a second similar controller PK2 that is adapted to occupy an off position $a'$ and a plurality of operative positions $b'$ to $n'$, inclusive, and that is employed during regenerative operation only, chiefly in connection with the manipulation of the resistors R1 and R2; a plurality of limit switches of a familiar type AL and RL, the former being employed during acceleration of the motors and the latter being employed during regenerative operation; a change-over switch COS of the drum type that is adapted to occupy two positions respectively marked "Acc." and "Reg.", standing for acceleration and regeneration, respectively; an auxiliary motor-generator set or dynamotor that is employed during regenerative operation and comprises a motor armature winding M, a generator armature winding G and a subdivided field-magnet winding having sections MF$a$ and MF$b$ that are connected in series-circuit relation with the armature winding M; a switch FC that is employed for field control of the motor-generator; and a plurality of relays respectively marked "Series relay" and "Multiple relay" that severally have their actuating coils connected across the main armature winding A1.

The single actuating coil of the accelerating limit switch AL is connected in the main circuit intermediate the resistor AR3 and the armature A2 thereby, at all times, receiving the current that traverses the armature A2; while the regenerating limit switch RL has its series actuating coil connected intermediate the armature A2 and the resistor R2, whereby the series coil receives the current of the armature winding A2 and also the current that is sent through the resistor R2 from the generator armature winding G. The relative positions of the respective limit switches will be readily appreciated by a reference to the simplified diagram of Fig. 1, which, as already mentioned, shows the essential main-circuit connections of the system shown in Fig. 8.

The limit switch RL is placed in the circuit shown because it has been found that, if the series coil of the limit switch receives both of the currents above referred to, the rate of deceleration of the regenerating machines is much more uniform than if a limit switch placed in the position occupied by the switch AL, for example, were used. Various tests giving the torque variations of the regenerating machines with a limit switch connected in the positions respectively occupied by the switches AL and RL conclusively show that the variation in the regenerative current over the range of practical operating speed employed is relatively small in the case of the limit switch RL, as compared with the limit switch AL. The regenerating limit RL is also provided with an auxiliary or shunt-connected actuating coil, as is more fully described in connection with the auxiliary control system of Fig. 9.

It should be observed that, although the auxiliary contact members of the limit switches AL and RL are disposed in series-circuit relation, provision has been made to render only one switch operative at a time. During acceleration, the switch RL remains down, since no current traverses the circuit of its actuating coil; whereas, during regeneration, the contact members 78 of the switch AL are bridged by contact segment $x$ of the master controller, and, consequently, the switch AL has no effect on the regenerative operation of the system.

The operating mechanisms of the controllers PK1 and PK2 are identical, each comprising a shaft 31 that is associated with the rotatable controller drum, and a pinion 32 that is attached to the upper end of the shaft 31 and is adapted to mesh with a suitable rack member 33 which has its respective ends provided with a plurality of piston members 34 and 35. The pistons 34 and 35 are respectively adapted to operate within suitable cylinders 36 and 37, the access of fluid pressure to which from a suitable tank or reservoir T, is governed by a plurality of suitable valve members 38 and 39, respectively. A plurality of actuating coils for the valves 38 and 39, respectively, are adapted to be energized during the operation of the system shown in Fig. 9, as more fully described later. The valve 38 is normally closed to exclude fluid pressure from the cylinder 36 but admits pressure thereto whenever the actuating coil 40 is energized, whereas the valve member 39 is normally open to admit fluid pressure to the cylinder 37 but is adapted to exhaust pressure therefrom when the actuating coil 41 is energized. In this way, fluid pressure is normally present in the cylinder 37 and is normally excluded from the cylinder 36, whereby the controller drum is biased to its off position, as indicated by the respective positions of the pistons 34 and 35.

The operation of the controllers PK1 and PK2, so far as the mechanical apparatus just described is concerned, may be set forth as follows:

When both of the actuating coils 40 and 41 are simultaneously energized, fluid pressure is exhausted from the cylinder 37 and is admitted to the cylinder 36 to effect a movement of the controller drum through its various operative positions until the actuating coil 41 is deënergized, when balanced-pressure conditions exist in the two cylinders 36 and 37, whereby the controller drum is positively and rapidly brought to rest in any desired position. In the system illustrated in Fig. 9, the operation of the valve member 39 is controlled by a limit switch to automatically effect a step-by-step operation of the controller drum in accordance with the required service conditions. To return the controller drum to its off position, it is merely necessary to simultaneously deënergize both actuating coils 40 and 41, whereby fluid pressure is exhausted from the cylinder 36 and is admitted to the cylinder 37.

Reference may now be had to the auxiliary governing system that is shown in Fig. 9, which comprises the actuating coils of the various main-circuit switches and of the controllers PK1 and PK2; a master controller MC1 that is adapted to occupy a plurality of positions $a$, $b$ and $c$ in an accelerating direction and a plurality of operative positions $a'$, $b'$ and $c'$ in a regenerative direction; a master reverser MR of a familiar type that is associated in the customary manner with a pair of actuating coils $r'$ and $f'$ of the main-circuit reversing switch RS; a plurality of electrical interlocking contact members of a familiar type that are associated with, and adapted to be actuated by, the various main-circuit switches in the familiar manner that is illustrated in Fig. 10 in connection with switch SW2. Inasmuch as the use of such interlock contact members is old and is well known to those skilled in the art, it is not deemed necessary to illustrate all of the main-circuit switches in conjunction with all of the corresponding interlocking contact members, and it is thought that the illustration of Fig. 10 will be sufficient for the purposes of the present specification.

The auxiliary governing system also comprises a suitable source of energy, such as a battery B, and a pair of actuating coils associated with the change-over switch COS and adapted to electrically control its movements to the accelerating or regenerating position, in accordance with the legends marked upon them. In addition to the "series relay" and the "multiple relay," already mentioned and which are adapted to perform circuit functions hereinafter described, a "multiple auxiliary relay" is also used in connection with the "multiple relay," having its actuating coil in series-circuit relation with the auxiliary contact members of the latter across the battery B.

Assuming that the master controller MC1 is moved to its final operative position $c$, the complete automatic accelerating operation of the system shown may be set forth as follows:

A circuit is first established from the positive terminal of the battery B, through conductor 50, control fingers 51 and 52, which are bridged by contact segment 53 of the master controller, conductor 54, contact segment 55 of the master reverser MR in its forward position, conductor 56, contact segment 57 of the reversing switch RS in its forward position, conductors 58, 59, 60, 61 and 62, the actuating coil of the switch LS1, conductors 63 and 64, interlock PK1—$a$, interlock COS—Acc., conductors 65, 66 and 67, contact member 68 of the change-over switch COS in its accelerating position, conductor 69, control finger 70, contact segments 71 and 72 and control finger 73 of the master controller, and conductor 74 to the negative terminal B— of the battery B. As soon as the switch LS1 is closed, its actuating circuit is transferred through an interlock LS1—in directly to the conductor 65 through conductor 65$a$.

Another circuit is simultaneously established from conductor 58, through conductor 56$a$, interlock J—out, conductor 57$a$, interlock M2—out, the actuating coil of the switch JR, interlock COS—Acc., and conductor 58$a$ to the negative conductor 66. The motors are thus connected in series-circuit relation with the accelerating resistors AR1, AR2 and AR3 across the supply circuit. The circuit connections just described correspond to the position $a$ of the master controller, and no further acceleration would occur were the master controller not to be moved to a subsequent position (see Fig. 14).

However, when the master controller occupies its position *b* or *c*, the automatic operation is further continued by the establishment of a circuit from the contact segment 53 of the master controller, through a control finger 75, conductor 76, interlock G—out, conductor 77, interlock LS1—in, the auxiliary contact members 78*a* and 78 of the limit switches RL and AL, respectively, conductor 79, interlock 80—COS—Acc., conductor 81, interlock 82—LS2—out, conductors 83 and 84, the actuating coil of the switch LS2, conductor 63, interlock LS1—in, and conductor 65 to the negative conductor 66.

Another circuit is established at this time from conductor 83, through conductor 85, the actuating coil 40 of the controller PK1, interlock J—out, conductors 86, 87 and 88, interlock PK1—*a* and thence to the negative conductor 66, as already described. Moreover, provided the limit switch AL has dropped to its lower position, further circuit is established through the auxiliary contact members thereof, as already described, to the conductor 81, whence circuit is completed through interlock 89—LS2—in, conductors 90, 91 and 91*a*, contact member 92—PK1—*a* to *d*, conductor 92*a*, interlock 93—JR—in, conductor 93*a*, interlock 94—SW1—out and the actuating coil 41 of the controller PK1 to interlock J—out and conductor 86, as already set forth.

As soon as the switch LS2 is closed, a holding circuit for its actuating coil is formed to include interlock 82—LS2—in and conductor 61*a*, which is connected to the energized conductor 60.

The two actuating coils of the controller PK1, being thus simultaneously energized, the controller is actuated to its initial operative position *b* to bring a contact member 42 of the controller (Fig. 8) into engagement with a plurality of control fingers that are associated with the resistor AR2, thereby short-circuiting one section thereof. As soon as the controller reaches its position *b*, the limit switch will have lifted, thereby temporarily preventing further operation of the controller. The controller PK1 is thus moved step-by-step, in accordance with the limit switch AL, to its position *e*, thereby gradually excluding the resistors AR2 and AR3 from circuit. The circuit connections at that time correspond to the position *b* of the master controller, or, in other words, full-series connection of the motors.

However, with the master controller occupying its position *c*, a circuit is next established from the contact segment 53, through control finger 95, conductors 96 and 97, contact member 98—PK1—*e* to *g*, interlock COS—Acc., interlock G—out, the actuating coil of the switch J and conductor 99 to the negative conductor 66. The actuating coil of the switch JR and the actuating coils 40 and 41 of the controller PK1 are deënergized upon the closure of the switch J by reason of the exclusion from their control circuits of the respective interlocks J—out. The two actuating coils of the controller PK1 being thus simultaneously deënergized, the drum returns to its off-position *a*.

When the limit switch AL has again dropped, a further circuit is completed through its auxiliary contact members to the conductor 90, as already described, and thence through conductor 100, interlock COS—Acc., conductor 101, interlock PK1—*a*, interlock M2—out, conductor 102, interlock JR—out, the parallel-connected actuating coils of the switches M2 and G1, conductor 103, interlocking COS—Acc., and conductor 104 to conductor 87, whence circuit is completed as already set forth. Upon the closure of the switches M2 and G1, the circuit of their actuating coils is transferred through interlock M2—in and conductor 101*a* to conductor 108. The closure of the switch G1 effects the opening of the switch J by reason of the exclusion of the interlock G1—out from the energizing circuits of its actuating coil. The motors have thus been brought to the initial parallel position by means of the familiar bridging transition method, and the resistors AR2 and AR3 are again actively connected in the circuits of the respective motors.

The opening of the switch J allows the energization of the actuating coil 40 of the controller PK1 through interlock J—out, as hereinbefore described. The other actuating coil 41 of the controller PK1 is also simultaneously energized, from the conductor 91, through conductor 105, interlock JR—out and conductor 93*a*, as already described. The controller PK1 is thus successively actuated through its various operative positions in accordance with the limit switch AL, the energization of the actuating coil 41 being continued beyond the position *e* of the controller PK1 by reason of the substitution for the contact member 92 of the interlock JR—out.

When the controller PK1 reaches its position *f*, a contact member 44 (Fig. 8) is adapted to effect the exclusion from circuit of a portion of the main field winding F1, and a contact member 45 is adapted to perform a similar office, when the controller reaches its final operative position *g*, in connection with the field winding F2. The well known "field control" is thus effected to produce a further accelerating step of the motors, as will be understood (see Fig. 15).

The regerative operation of the system will now be described. The general function of the relays respectively marked "Series relay", "Multiple relay" and "Multiple auxiliary relay" may first be pointed out to advantage, and the specific connections effected by them will be described later in connection with the regenerative operation. However, the use of such relays in a system of control is not of my present invention, but is shown and described and claimed in a copending application of Arthur J. Hall, Serial No. 71,192, filed Jan. 10, 1916, and assigned to the Westinghouse Electric and Manufacturing Company. The series relay is adapted to act as a relatively low voltage, for example, 200 volts, to effect the connection of the machines in series relation across the supply circuit, provided the speed of the machine is so low that it would be impossible to affect regeneration by parallel connection of the machines. On the other hand, the multiple relay and multiple auxiliary relay in conjunction are adapted to connect the motors in initial parallel-circuit relation across the supply circuit, provided the voltage of each motor is sufficient to individually effect regenerative operation to the supply circuit. By the use of both the multiple relay and the multiple auxiliary relay in conjunction, the operation of the circuits governed by them is delayed slightly behind the operation of the circuits that are governed by the series relay whereby, in case of relatively low speeds of the momentum-driven machines, the series relay will act first to effect the series connection of the machines before the multiple relay has an opportunity to effect its circuit changes. In other words, if the multiple relays are actuated, although the series relay is of necessity also operated, the momentum-driven machines are initially connected in parallel-circuit relation; the PK2 drum is then automatically operated, in accordance with the limit switch RL, to effect a gradual short-circuit of the resistors R1 and R2 as the machine speeds decrease; the machines are then automatically changed over to series-circuit relation, with the resistors R1 and R2 initially in circuit; and these resistors are then again gradually short-circuited as the speeds of the machines still further decrease. However, in case conditions are such that parallel regenerative operation of the machines is impracticable, the series relay alone acts, whereby the control drum PK2 is immediately moved through positions that correspond to parallel operation of the machines to the initial position that corresponds to the series relation thereof, and the remaining operation of the system is the same as before.

Assuming that conditions are suitable for parallel regenerative operation of the machines; the master controller MC may be first moved to its final operative position $c'$, whereby a circuit is first established from the positive terminal of the battery B, through the master controller in its position $c'$ and the master reverser in its forward position, and to the conductor 56a, as described in connection with acceleration, and thence, through conductor 67a, interlocks PK2—a, PK1—a, SW2—out and LS1—out, the actuating coil of the change-over switch COS that corresponds to regenerative operation, contact segment 68a of the change-over switch in its accelerating position, conductor 69a, control fingers 70a and 73, which are bridged by contact segment 71a of the master controller, and thus to the negative terminal of the battery B. The change-over switch COS is thus actuated to its position corresponding to regenerative operation wherein the circuit just described is broken at the contact segment 68a.

Another circuit is then established from conductor 56a, through conductor 106, the parallel-connected actuating coils of the switches FC, SW2 and SW1 and the actuating coil 40 of the controller PK2, conductor 107, interlock COS—Reg., conductors 58a and 66 and the contact member 68a of the change-over switch to the battery B, as already described.

The closure of the switch FC effects the inclusion of the field-magnet winding MFb of the motor-generator or dynamotor in the circuit thereof. It will be understood that this motor-generator or dynamotor may be employed during acceleration of the main motors for the purpose of supplying energy to the various auxiliaries employed upon the car, such as the lighting and the control systems, if desired, and may also be used to mechanically drive an air-compressor, in accordance with familiar practice. However, in such a case, it has been found to be of advantage to increase the field excitation of the motor-generator or dynamotor during regenerative operation of the main machines, and this increased excitation is obtained by the closure of the switch FC as just described.

Figure 16:
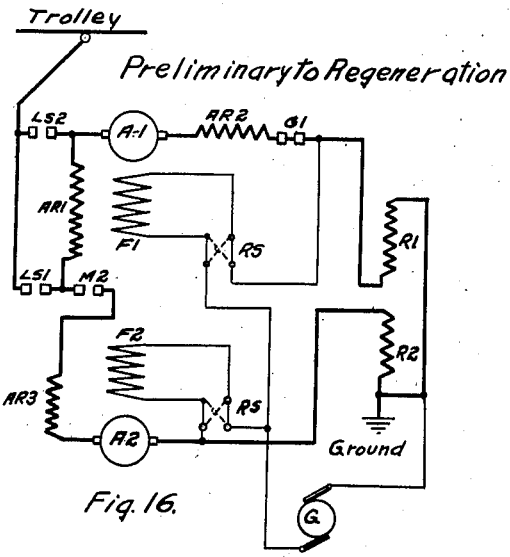
Figure 17:
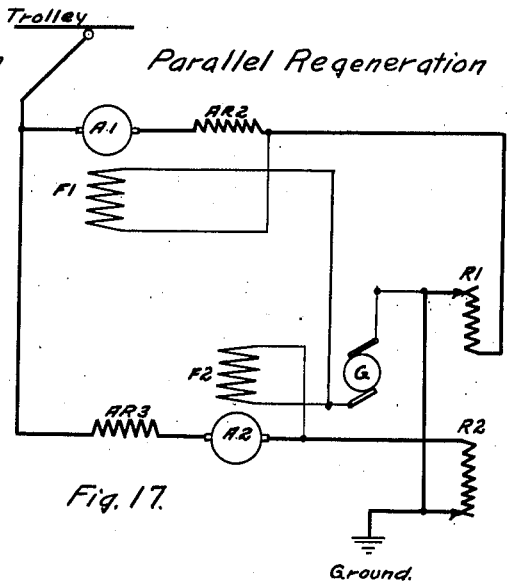

The closure of the switches SW1 and SW2 effects the connection of the generator-armature winding G through the resistors R1 and R2, respectively, to the field magnet windings F1 and F2, as simply illustrated in Fig. 1 (see also Fig. 16).

Another circuit is simultaneously established from conductor 56a, through conductors 108 and 109, contact member PK2—$a'$ to $g'$, conductors 110 and 111, the auxiliary contact members 112 of the multiple auxiliary relay in its upper position, the actuating coil of which has been energized through the closure of the multiple relay, as already mentioned, conductor 113, interlock COS—Reg., conductor 101, thence through the actuating coils of the switches M2 and G1, as already set forth, conductor 103, interlock J—out and conductor 104 to the negative-circuit conductor 66, as hereinbefore described.

A further circuit is established from the master controller, through the actuating coil of the switch LS1, as set forth in connection with the acceleration of the motors, to the interlock PK1—a, whence its circuit is completed through conductor 114, the auxiliary contact members 115 of the multiple auxiliary relay in its upper position, conductor 116 and conductor 65a to the negative conductor 66. The momentum-driven machines at this time are thus connected in the manner shown in Fig. 1 (see also Fig. 17).

Another circuit is simultaneously established from the conductor 60, through conductor 118, interlock COS—Reg., conductor 81 and the interlock 82—LS2—out to the actuating coil of the switch LS2 and thence, through the interlock PK1—a, as already described in connection with the switch LS1. The circuit connections just described correspond to the postion a' of the master controller, and no further regenerative operation would occur if the master controller were not moved to one of its subsequent positions.

Provided that the limit switch RL has dropped to its lower position, circuit is next established from contact segment 53a of the master controller in position b' or c', through control finger 75, conductor 76, contact member 119 of the controller PK2 in its off position a', conductor 77, interlock LS1—in, the auxiliary contact members 78a of the limit switch RL, contact segment X of the master controller, conductor 79, interlock COS—Reg., conductors 120 and 121, the actuating coil 41 of the PK2 controller, interlock SW1—in and conductor 122 to the negative conductor 66. Both actuating coils of the PK2 controller being thus simultaneously energized, a step-by-step movement of the controller, in accordance with the operation of the limit switch RL, will occur.

The circuit disposition of the series actuating coil of the limit switch RL has already been described and its purpose pointed out. As a further means of obtaining a desirably constant regenerated current, the limit switch RL is provided with an auxiliary battery-energized actuating coil c1 that is brought into operation in various positions of the controller PK2 to vary the setting of the switch and thus aid in producing a substantial equalization of the torques of the several machines and of the regenerated currents throughout the regenerating period. For example, it will be observed that the coil c1 is connected in circuit in positions c', d' and j' and k' of the controller PK2, but is inoperative at other times.

The controller PK2 is actuated, in a step-by-step manner already described, to the position f' which corresponds to full-parallel relation of the regenerating machines and to position b' of the master controller, the resistors R1 and R2 having been gradually short-circuited, as the controller moved in accordance with the operation of the limit switch RL, to maintain a substantially constant regenerated current, as will be understood. Provided the master controller occupies its position c', the energization of the actuating coil 41—(PK2) is maintained until the switch G1 opens and the interlock G1—out thus becomes operative, through contact segment 53a control finger 95, conductor 96, control finger 96a, and contact segment 119.

As soon as the controller PK2 occupies its position g' the short-circuits of the resistors R1 and R2 are removed. Also a control circuit is established from the conductor 56a, through conductor 125, contact member 126—PK2—g' and h', auxiliary contact members 127 of the series relay in its upper position, the actuating coil of the switch J and conductor 99 to the negative conductor 66.

In order to prevent a path of relatively low resistance being connected across the supply circuit by the closure of the switch J at the time that the other switches, already mentioned, are closed, the transition resistor RJ is employed in series-circuit relation with the switch J. As illustrated in Fig. 8, when the controller PK2 occupies its position g', the entire resistor RJ is connected in circuit and, in the two succeeding positions h' and i', the resistor is gradually short-circuited, the switches M2 and G1 having been opened immediately upon the closure of the switch J by reason of the exclusion of the interlock J—out from the control circuit of the actuating coils. When these switches have been opened, there is no longer any danger of a short-circuit connection, and, consequently, the resistor RJ may be excluded from circuit.

Moreover, upon the occupation of position g' by the controller PK2, contact segment 123 thereof (Fig. 8) engages control finger 124, whereby the hitherto separated ends of the resistors R1 and R2 are connected to dispose the resistors in parallel-circuit relation, it being found that a lesser variable circuit resistance is desirable during series regeneration.

Figure 18:
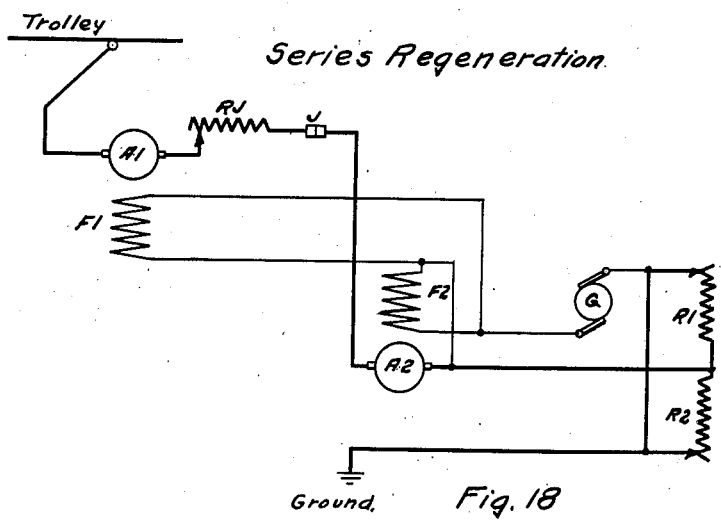

At this time, therefore, the regenerating machines are connected in series-circuit relation, with the parallel-connected resistors R1 and R2 actively in circuit (see Fig. 18). The further step-by-step automatic actuation of the controller PK2 again effects the gradual short-circuit of the resistors R1 and R2 to maintain a substantially constant regenerated current to a relatively low vehicle speed.

Assuming, now, that the speed of the momentum-driven motors is unsuitable for setting up parallel regenerative operation, but that the initial voltage induced in the armatures of the machines through the energization of their fields by the generator armature winding G is equal to 200 volts or any other predetermined value that is suitable for series regeneration, the operation of the system, upon the actuation of the master controller to its position $c'$, may be set forth as follows:

The switches FC, SW2 and SW1 are closed and the actuating coil 40 of the controller PK2 is energized, as already related in connection with the multiple regeneration of the machines. Simultaneously, another circuit is established from conductor 108, through conductor 109, contact member PK2—$a'$ to $g'$, conductors 110, auxiliary contact members 128 of the multiple auxiliary relay in its lower position, conductor 129, interlock PK1—$a$ and conductors 130 and 121 to the actuating coil 41 of the controller PK2.

The energization of the coil 41 is thus independent of the operation of the limit switch RL, and the controller PK2 is rapidly moved to its position $h'$, whereby the circuit is broken at the interlock PK2—$a'$ to $g'$. However, the energization of the actuating coil 41—(PK2) is maintained as far as position $j'$ by reason of the bridging of the auxiliary contact members 78$a$ of the limit switch RL by a contact member 117—PK2—$g'$ to $i'$, the circuit being otherwise as already described in connection with multiple regeneration. The switches M2 and G1 are prevented from closing by reason of the exclusion of the auxiliary contact members 112 of the multiple auxiliary relay from the circuit of their actuating coils.

At the same time, the actuating coil of the switch LS1 is energized from the master controller, in the manner already related, to the conductor 64, whence circuit is now completed through conductors 88 and 131, auxiliary contact members 132 of the series relay in its upper position, conductor 133, contact member 134—PK2—$g'$ to $n'$, and conductor 135 to the negative conductor 66. The switch LS2 is then closed, as soon as the limit switch RL has dropped to its lower position, through the circuit already traced in connection with the multiple regeneration of the machines. The switch J is also brought in as soon as the PK2 controller occupies the position $g'$, in the manner already described in connection with the transition of the machines from parallel to series relation. The energizing circuit of the actuating coil 41 of the PK2 controller is then transferred through the auxiliary contact members 78$a$ of the limit switch RL, as hereinbefore described, and the PK2 controller, from that time on, is actuated in accordance with the operation of the limit switch RL, and in exactly the same manner as that set forth in connection with the latter or series portion of the regenerative operation hereinbefore described.

It will be observed that one of the most advantageous features of the automatic system just described is the combination of means for inherently imparting to the regenerating machines a negative compound characteristic and limit-switch controlled means for varying the field excitation of the machines as their speed decreases to maintain a substantially constant regenerated current. The advantages of the negative compound characteristic that is provided in my system, such as the instantaneous regulating action and the elimination of relay-controlled or other devices, such as have been used in the prior art, are evident.

I do not wish to be restricted to the specific circuit connections or arrangement of parts herein set forth, as various modifications may be made therein without departing from the spirit and scope of my invention. I desire, therefore, that only such limitations shall be imposed as are indicated in the appended claims.

I claim as my invention:

1. In a system of control, the combination with a supply circuit, and a plurality of parallel-connected main dynamo-electric machines severally having armatures and field windings, of a motor-generator embodying a driving and a driven armature winding, a plurality of translating devices connected in series relation between points respectively intermediate the corresponding main armatures and field windings, means for connecting said driving armature winding between the positive supply-circuit conductor and a point intermediate said translating devices, means for connecting said last intermediate point to the negative supply-circuit conductor, and means for connecting said driven armature winding between said negative conductor and the terminals of the main field windings that are remote from the corresponding armatures.

2. In a system of control, the combination with a plurality of parallel-connected dynamo-electric machines severally provided with armatures and plural-section field windings respectively having their sections differentially disposed, the one to the other, during regenerative operation, of a single source of energy for corresponding sections of said field windings, whereby the differential effect in each machine inherently tends to maintain a substantially constant regenerated current thereof independently of any other machine.

3. In a system of control, the combination with a supply circuit, and a dynamo-electric machine having an armature and a field-magnet winding, of means associated therewith for inherently imparting to the machine a negative compound characteristic during regeneration, and means for automatically maintaining a substantially constant regenerated current as the machine speed decreases.

4. In a system of control, the combination with a supply circuit, and a plurality of dynamo-electric machines severally having armatures and field-magnet windings, of means associated therewith for inherently and independently imparting to the machines a negative compound characteristic during regeneration, and means for automatically varying circuit conditions to maintain a substantially constant regenerated current as the machine speeds decrease.

5. In a system of control, the combination with a supply circuit, and a plurality of dynamo-electric machines severally having armatures and field-magnet windings, of auxiliary means associated therewith for inherently and independently imparting to the machines a negative compound characteristic during regeneration, and means actuated in accordance with the current in a predetermined portion of the circuit for varying circuit conditions to maintain substantially constant regenerative conditions.

6. In a system of control, the combination with a supply circuit, and a plurality of dynamo-electric machines severally having armatures and field magnet windings, of a single auxiliary source of energy having one terminal connected to one end of each of the field windings and a plurality of variable translating devices severally connected intermediate the other terminal of the auxiliary source and the other ends of the respective field windings during regeneration, and means adapted to be automatically actuated step-by-step in accordance with the current traversing said translating devices for gradually varying said devices as the machine speeds decrease.

7. The method of operating a plurality of dynamo-electric machines which consists in connecting said machines in parallel relation, connecting a source of energy in series relation with a plurality of translating devices across the field windings of the respective machines, connecting the machines in series relation, and connecting the translating devices in parallel relation.

8. The method of regeneratively operating a plurality of dynamo-electric machines which consists in initially connecting an auxiliary source of energy in series relation with a plurality of translating devices across the field windings of the respective machines, connecting the machines to a supply circuit in parallel relation, varying said translating devices to regulate the current traversing the machines, connecting the resistors in parallel relation, connecting the machines in series relation, and again varying said translating devices.

9. In a system of control, the combination with a supply circuit, and a plurality of main dynamo-electric machines severally having armatures and field-magnet windings, of means including a single auxiliary exciting armature winding connected to the machine to impart thereto a negative compound characteristic during regeneration, a driving armature winding for said exciting armature winding, and means for exciting both auxiliary armature windings in accordance with the load upon said driving armature.

10. In a system of control, the combination with a supply circuit, and a plurality of main dynamo-electric machines severally having armatures and field-magnet windings, of a plurality of resistors connected in series relation with the respective main armatures across the supply circuit, a single exciting armature winding connected through each field winding across the corresponding resistor, and a driving armature winding for said exciting armature winding energized from the supply circuit and provided with a series-related exciting winding.

11. In a regenerative system of control, a plurality of dynamo-electric machines having armature and field windings, unitary means for jointly varying the excitation of said machines in accordance with the line voltage, and means for severally varying the excitation of the machines in accordance with the load current.

12. In a system of regenerative control, a plurality of dynamo-electric machines having armature and field windings, means comprising an auxiliary dynamo-electric machine for jointly varying the excitation of said field windings in accordance with the line voltage, and means for independently varying the excitation of each field winding in accordance with the respective loads on the dynamo-electric machines.

13. In a system of regenerative control, a plurality of dynamo-electric machines having armature and field windings, means comprising a series-excited dynamotor for jointly varying the excitation of said field windings in accordance with the line voltage, and means for independently and quickly varying the excitation of each field winding in accordance with the respective loads on the machines.

In testimony whereof, I have hereunto subscribed my name this 31st day of July, 1915.

RUDOLF E. HELLMUND.